Figure 1:
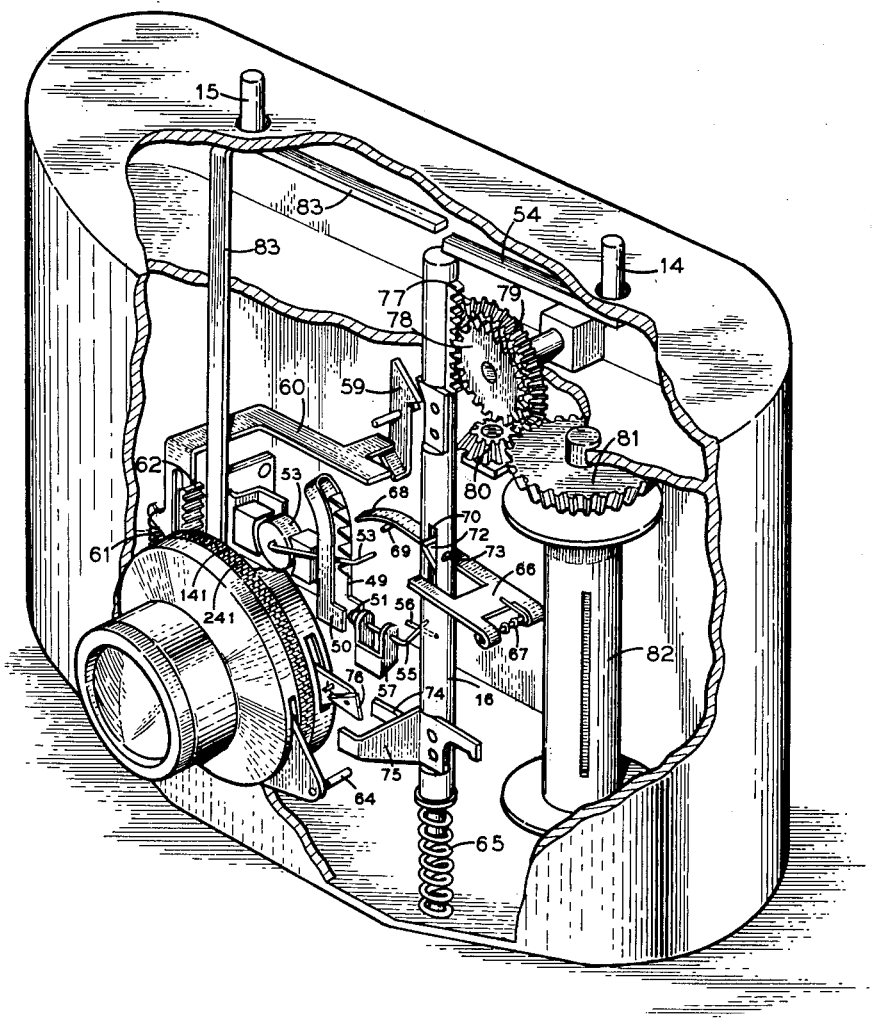

May 16, 1961 H. MELLE 2,984,164
AUTOMATIC EXPOSURE ADJUSTMENT IN PHOTOGRAPHIC CAMERAS
Filed Jan. 6, 1956 2 Sheets-Sheet 2

INVENTOR.
Heinz Melle
BY
Blum, Moscovitz, Friedman & Blum
ATTORNEYS

United States Patent Office 2,984,164
Patented May 16, 1961

2,984,164
AUTOMATIC EXPOSURE ADJUSTMENT IN PHOTOGRAPHIC CAMERAS

Heinz Melle, Braunschweig, Germany, assignor to Voigtlander Aktiengesellschaft, Braunschweig, Germany, a corporation of Germany Filed Jan. 6, 1956, Ser. No. 557,820

Claims priority, application Germany Jan. 12, 1955

8 Claims. (Cl. 95—10)

This invention relates to photographic cameras and, more particularly, to photographic cameras including mechanism operable, responsive to actuation of a control element, to automatically adjust the exposure condition controlling means in accordance with the indication of an electric exposure meter by scanning the indicating position of the exposure meter indicator to control the degree of such adjustment.

Photographic cameras are known in which either the diaphragm opening or the shutter time is automatically adjusted in accordance with the indication of an exposure meter included in the camera. In such cameras, the operator first manually sets a predetermined value of either the diaphragm opening or the shutter time, and thereafter the shutter time or the diaphragm opening is adjusted in accordance with the light conditions then prevailing. This adjustment is effected by the use of scanning or contact means to scan the position of an indicating element associated with the exposure meter. It will be observed that, in these cameras, one of the exposure values, that is, either the diaphragm opening or the shutter time, must first be manually pre-set by the operator before the other exposure value is automatically adjusted.

It has also been proposed to provide cameras in which the diaphragm aperture controlling means and the shutter time controlling means are provided with individual scanning means cooperable with means associated with the exposure meter indicator or pointer, so that both the diaphragm aperture and the shutter time may be adjusted automatically in accordance with the indication of the exposure meter. While, at first glance, this may seem to provide a satisfactory solution to the problem, it has been found in practice that it is not practical and consequently has not gone into practical use. The reason for this is that the structurally fixed combination of diaphragm values and time values over the entire range of deflection of the exposure meter indicator is too arbitrary and is not adapted to yield satisfactory results under greatly varying picture taking conditions.

In accordance with the present invention, a photographic camera is provided in which, as the result of operation of a single master operator, one of a pair of exposure condition controlling means is adjusted to a predetermined position, such as one of its available terminal positions, and the other exposure controlling means is automatically adjusted in accordance with the indication of an exposure meter incorporated in the camera. One of the exposure condition controlling means may be the diaphragm aperture controlling means, the other exposure condition controlling means may be the shutter time adjusting means.

As a feature of the invention, the camera includes individual operating members or release keys associated with each different picture motif group, such as instantaneous pictures or pictures in which a depth of focus is particularly desirable. In a particular embodiment of the invention, two of these individual operating members or release keys are provided. The key for instantaneous exposures, immediately upon actuation, operates the aforementioned master operator to effect the automatic adjustments and to operate the shutter, in one direction of movement, and, in the reverse direction of movement, to re-set the shutter and re-set the exposure condition controlling means to their initial setting. The other release key may be a "depth of focus" release key. When this key is actuated, it first shifts a driving member from a position in which the latter is normally engaged with one exposure condition adjusting element to a position in which the driving member is operatively associated with a second exposure condition adjusting element. After effecting this initial shifting, this second release key then operates the master operator in the same manner as does the first or "instantaneous exposure" release key. By virtue of these provisions, it is only necessary for the user of the camera to direct the camera at the subject matter to be photographed and then to actuate one or the other of the release keys depending upon the nature of the subject matter to be photographed.

Figure 2:
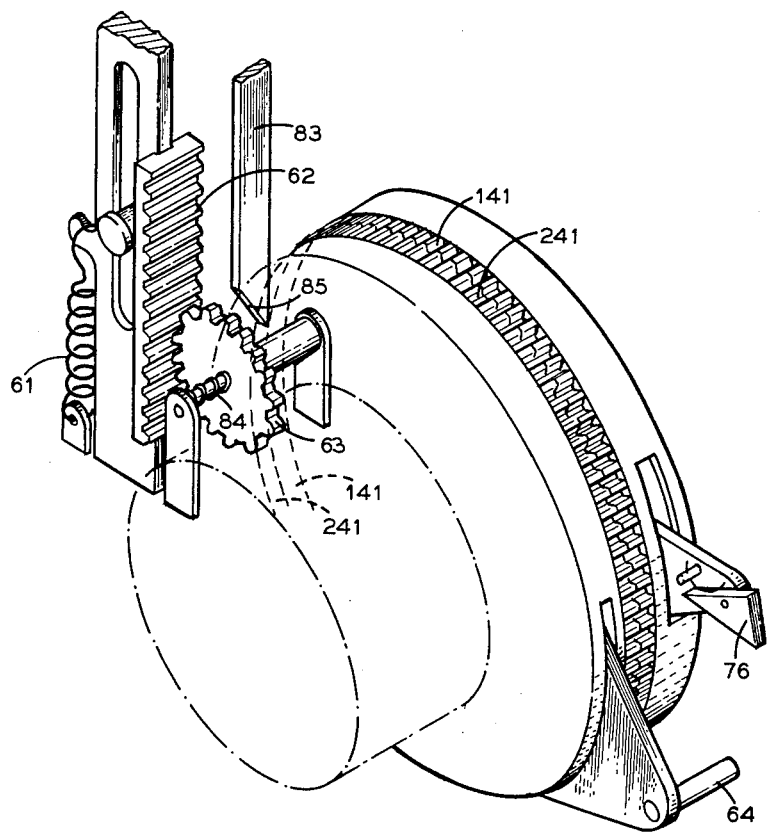

For an understanding of the principles of the invention, reference is made to the following description of a typical embodiment thereof as illustrated in the accompanying drawing. In the drawing:

Fig. 1 is a perspective view, partly broken away, of a photographic camera embodying the invention; and Fig. 2 is an enlarged perspective view, partly broken away, illustrating a detail of the transmission of the indicator scanning means position to the exposure condition adjusting elements.

Referring to Fig. 1, all of the automatic mechanism for assuring correct picture taking is mounted within a camera casing having a pair of operating buttons or release keys 14 and 15 projecting from the upper wall thereof. The camera shown in Fig. 1 is provided with a photoelectric exposure meter, including a photoelectric cell (not shown) whose output is applied by suitable conductors to a moving coil system 53 having associated therewith an indicating element 52. The indicating element 52 moves between a pair of spaced clamping jaws 49 and 50, at least one of which has stepped portions for engaging the pointer 52. The spaced clamping jaws 49 and 50 are resiliently biased toward each other so as to clamp the indicator 52 against movement. An eccentric or cam 51 is disposed between the lower ends of the jaws 49 and 50 and is fixed to the shaft of a crank 55 rotatable in a bracket 57. Normally, crank 55 is held in such a position that eccentric or cam 51 maintains the clamping jaws 49 and 50 spread to provide for free movement of the indicator 52 therebetween.

The camera includes two exposure condition adjusting elements, 141 and 241, which are preferably in the form of ring gears concentric with the camera objective. Referring to Fig. 2, a transmission pinion 63 is normally engaged with the adjusting element 141 so that, when a rack 62 on a scanning means 60 is moved downwardly under the bias of a spring 61, adjusting element 141 is rotated to set the exposure conditions. As will be described, under certain conditions, the transmission pinion 63 is shifted to the left, in a manner to be described, so that it disengages the element 141 and is engaged with the element 241.

If now, one of the release buttons, for example button 14 for "Moment," is pressed the master operator rod 16 is depressed by arm 54, and the following happens:

(1) First, the shorter arm of crank 55 is released by driving pin 56 or release rod or master operator 16. Due to the spring pressure of the expanded clamping jaws 49, 50 on toggle 51, lever 55 is turned in bracket 57 so that the clamping jaws 49 and 50 arrest pointer 52 in its measuring position.

(2) Subsequently, arm 58 of release pin 16 tilts pawl 59 to such an extent that scanning means 60 can move downward under the bias of spring 61, until it contacts the tip of pointer 52. During this downward movement of scanning means 60, one of the two adjusting elements 141 or 241 is turned, by rack 62 and pinion 63, until an adjustment of the diaphragm aperture and shutter time corresponding to the light measurement is attained.

(3) Subsequently the shutter release lever 64 is operated by arm 75 on master operator 16.

After release of the shutter and release of button 14, spring 65 forces pin 16 back to its initial position. During this movement, pin 56 lifts lever 55, whereby, through toggle 51, the clamping jaws 49 and 50 are expanded, so that the measuring pointer can again move freely.

Also, upon upward movement of operator 16, scanning means 60 is again engaged over the lower off-set end of pawl 59. This is effected by means of a lever 66 pivoted on an axle fixed to the camera casing. Lever 66 is fork-shaped, and includes a long arm 68 and a short arm 73. Normally, longer arm 68 is engaged with a pin 69 fixed in the camera casing, this engagement being effected either by gravity or by a spring 67 associated with lever 66.

If the button 14 were pressed sufficiently to release the shutter, scanning means 60 is in engagement with indicator 52. Also, a pivoted dog 72, pivotally mounted on a shaft 71 in a slot 70 in operator 16, is below the lever 66. A spring 65 biases operator 16 upwardly, the nose of dog 72 engages beneath the short arm 73 of lever 66 to lift this lever, or turn it clockwise as viewed in Fig. 1. As a result, the longer arm 68 of lever 66 engages scanning means 60 and lifts it so that the latter will engage over the lower end of pawl 59. The dimensions of the short lever arm 73 are selected in such a manner that this arm will disengage the nose of dog 72, as soon as contact ledge 60 is engaged with pawl 59. Thereby, under the effect of its own weight, or by the bias of spring 67, lever 66 moves downwardly until its arm 68 engages pin 69.

The return movement of rod 16 effects setting of the shutter. By means of projection 74 of shutter release arm 75, the shutter is set through rocker 76. The latter is pivotally mounted so that it may rock clockwise (Fig. 2) to permit passage of projection 74 upon downward movement of rod 16.

Furthermore, return movement of rod 16 effects advance of the film. A rack 77 on the upper end of rod 16 is engaged with a pinion 78 coaxial with a bevel gear 79 and drivingly connected with the latter through a one-way coupling so that bevel gear 79 is rotated only upon upward movement of rod 16. Bevel gear 79 meshes with the bevel pinion 80 which, in turn, meshes with a bevel gear 81 on the film wind-up spool 82. The correlation of parts is such that, upon each upward movement of rod 16, the film is advanced by one step or frame. Thus, it will be understood that, without any additional operation, a snapshot corresponding to the light value is made and subsequently the camera is made ready for taking another picture.

If a photographic picture should be taken in which large depth of focus is essential, the release key 15 is pressed. Upon pressing this key 15, the arm 83, after a small idle stroke, engages the upper end of operator 16. Subsequently, the master operator pin 16 is pressed down in the same manner as by arm 54, whereby all functions derived therefrom take place in the same manner as described above.

The idle stroke of arm 83 has the object of shifting transmission pinion 63, engaged with rack 62 of scanning means 60, in such a manner that it is shifted from its engagement with adjusting element 141, to which it is biased by spring 84, to adjusting element 241. This shifting is effected by an inclined surface 85 on the lower end of the downwardly directed extension of arm 83. Upon pressing down key 15, pinion 63 is forced sidewise by inclined surface 85 to such an extent that it engages adjusting element 241.

It will be understood from the above that in the cameras embodying the present invention under correct and most favorable exposure conditions, merely the distance is adjusted, and the exposure meter, with the camera, is turned toward the object to be photographed, whereupon only a single button has to be pressed. The invention is not limited to specific camera types and can be applied to all photographic picture taking devices.

It will also be understood that the invention is not limited to the specific details disclosed and can be carried out with various modifications without departing from the scope of the invention as defined in the appended claims.

What is claimed is:

1. In combination with a photographic camera including an objective, a shutter, shutter release means, shutter setting means, exposure condition controlling means including diaphragm aperture adjusting means and shutter time adjusting means, and a photoelectric exposure meter: an indicator for said exposure meter movable in accordance with light incident on the latter; locking means selectively operable to lock said indicator in its then indicating position; at least one adjusting element for said exposure condition controlling means; indicator scanning means in driving engagement with said adjusting element; means biasing said scanning means to move into contact with said indicator; latching means releasably holding said scanning means at a position in which said scanning means is out of the path of movement of said indicator and in which said adjusting element is operated to a predetermined initial setting position; a master operator movable between a first position and a second position; and means biasing said operator to said first position; said operator, upon movement toward said second position, first effecting locking operation of said locking means, then actuating said latching means to release said scanning means, and finally operating said shutter release means.

2. The combination claimed in claim 1 including a pair of release keys; one of said keys, immediately upon actuation thereof, engaging said operator and moving it toward said second position; the other of said keys, upon actuation thereof, engaging said operator, after a predetermined lost motion, and moving said operator toward said second position; and means operable by said other release key, during such lost motion, to modify the driving engagement between said scanning means and said adjusting element.

3. The combination as claimed in claim 1 in which said operator, upon return movement from said second position toward said first position, operates said shutter setting means, retracts said scanning means to said position out of the path of movement of said indicator, and releases said locking means to provide for free movement of said indicator.

4. The combination claimed in claim 1 including film advancing mechanism; means on said operator effective, during return movement of said operator toward said first position, to operate said film advancing mechanism to advance the film by one frame or step.

5. In combination with a photographic camera including an objective, a shutter, shutter release means, shutter setting means, exposure condition controlling means including diaphragm aperture adjusting means and shutter time adjusting means, and a photoelectric exposure meter: an indicator for said exposure meter movable in accordance with light incident on the latter; locking means selectively operable to lock said indicator in its then indicating position; a pair of adjustment elements for said exposure condition controlling means; indicator position scanning means; transmission means normally connecting said scanning means in driving engagement with one of said adjusting elements; means biasing said scanning means to move into contact with said indicator; latching means releasably holding said scanning means at a position in which said scanning means is out of the path of movement of said indicator and in which said one adjusting element is operated to a predetermined initial setting position; a master operator movable between a first position and a second position; means biasing said operator to said first position; said operator, upon movement toward said second position, initially effecting locking operation of said locking means, then actuating said latching means to release said scanning means, and finally operating said shutter release means; a pair of release keys operatively asociated with said operator; one of said release keys, immediately upon actuation thereof, engaging said operator to move the same toward said second position; the other of said release keys, upon actuation thereof, engaging said operator after a lost motion and moving said operator to said second position; and means operable by said other release key, during such lost motion, to shift said transmission member to disconnect the driving engagement between said scanning means and said one adjusting element and to establish a driving connection between said scanning means and the other adjusting element.

6. The combination claimed in claim 5 including means normally biasing said transmission member to establish a driving connection between said scanning means and said first adjusting element.

7. The combination claimed in claim 5 in which said one release key is used for taking instantaneous exposures, and the other release key is actuated in the taking of exposures having an enhanced depth of focus.

8. The combination claimed in claim 5 in which said adjusting elements are formed with ring gears; a rack forming part of said scanning means; said transmission means comprising a pinion engageable with said rack and one of said ring gears; said pinion being normally engaged with the ring gear of said one adjusting element, and being selectively axially slidable to disengage the ring gear of said one adjusting element and engage the ring gear of said other adjustable element; said other release key, upon operation thereof, and during said lost motion, effecting such axial displacement of said pinion.

References Cited in the file of this patent
UNITED STATES PATENTS

| | | |
|---|---|---|
| 2,148,963 | Rauch | Feb. 28, 1939 |
| 2,206,626 | Belchner | July 2, 1940 |
| 2,213,742 | Mihaly | Sept. 3, 1940 |
| 2,343,206 | Rath | Feb. 29, 1944 |
| 2,504,312 | Fairbank | Apr. 18, 1950 |
| 2,596,328 | Dorsey | May 13, 1952 |
| 2,662,457 | Fairbank | Dec. 15, 1953 |